United States Patent [19]

Yoshida et al.

[11] Patent Number: 4,933,123
[45] Date of Patent: Jun. 12, 1990

[54] SURFACE TREATMENT METHOD

[75] Inventors: Takao Yoshida, Tama; Keinosuke Isono, Kawaguchi, both of Japan

[73] Assignee: Material Engineering Technology Laboratory, Incorporated, Tokyo, Japan

[21] Appl. No.: 213,152

[22] Filed: Jun. 29, 1988

[30] Foreign Application Priority Data

Jun. 29, 1987 [JP] Japan .................................. 62-163418
Aug. 5, 1987 [JP] Japan .................................. 62-195550

[51] Int. Cl.$^5$ ............................................. B29C 71/04
[52] U.S. Cl. ......................................... 264/22; 264/25; 264/132; 425/174.4; 427/44
[58] Field of Search ................... 264/22, 25, DIG. 45, 264/132; 425/174.4; 427/44

[56] References Cited

U.S. PATENT DOCUMENTS

| | | | |
|---|---|---|---|
| 3,075,868 | 1/1963 | Long | 264/80 |
| 3,515,615 | 6/1970 | Okada et al. | 264/22 |
| 3,522,076 | 7/1970 | Wright | 264/22 |
| 3,522,226 | 7/1970 | Wright | 264/22 |
| 3,900,538 | 8/1975 | Kawakami et al. | 264/22 |

OTHER PUBLICATIONS

UV Light: Its effects on plastics, King, *Plastics and Polymers*, Jun. 1968, pp. 195–203.

Primary Examiner—Jeffery Thurlow
Attorney, Agent, or Firm—Oblon, Spivak, McClelland, Maier & Neustadt

[57] ABSTRACT

A surface treatment method for improving the adhesiveness of a surface of a molded article made of a polyolefin resin with a printing ink, which entails irradiating the surface with an abundance of high-energy ultraviolet radiation from a high-output low-pressure mercury vapor lamp having an envelope made of synthetic quartz glass, and wherein the lamp has a wattage per unit lamp length of about 0.1–0.5 W/mm.

10 Claims, 2 Drawing Sheets

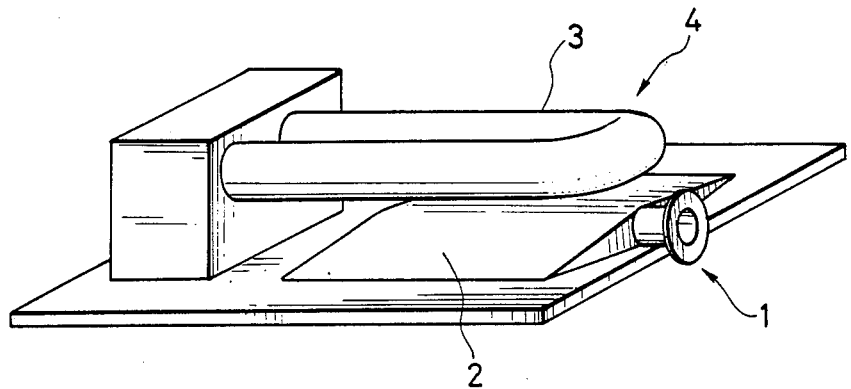
FIG. 1
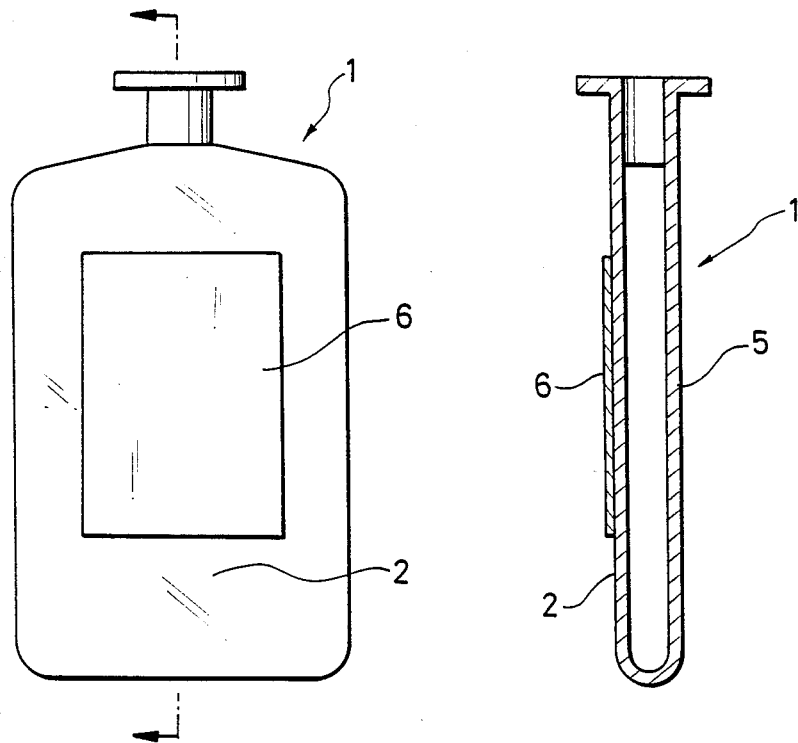
FIG. 2
FIG. 3

SURFACE TREATMENT METHOD

BACKGROUND OF THE INVENTION

1. Field of the Invention

This invention relates to a method for improving the printability of plastic surfaces and, more particularly, to a method for improving the printability of surfaces of polyolefin resin moldings by exposing the surfaces to ultraviolet radiation. Still more particularly, it relates to a method for improving the printability of a surface of the barrel of a syringe (hereinafter referred to as "syringe barrel") formed of a polypropylene resin by exposing the surface to ultraviolet radiation.

The surface treatment method of the present invention is characterized in that the printability of surfaces of polyolefin resin moldings is improved by exposing the surfaces to a specific kind of ultraviolet radiation.

2. Description of the Prior Art

It is generally known that, if it is desired to print surfaces of polyolefin resin moldings, the printability of such surfaces must be improved by a suitable pretreatment (i.e., surface treatment) because polyolefin resins are inert to printing inks.

Especially where an ultraviolet radiation-curing ink comprising an acrylic resin as the base material is used, there is a limit in improving its affinity for polyolefin resins. Moreover, since the ink gives a cross-linked and cured film, a separation tends to occur at the interface between the resin surface and the ink film. Thus, a more adequate pretreatment is required in this case.

Conventionally, a number of surface treatment methods have been proposed with a view to improving the printability of surfaces of polyolefin resin moldings, and some of them have been put to practical use.

These surface treatment methods include, for example, plasma treatment in which a low-temperature plasma is generated under reduced pressure and brought into contact with a surface to be printed of a molded article; corona discharge treatment in which a plasma is generated by a corona discharge at atmospheric pressure and brought into contact with a surface to be printed of a molded article; and flame treatment in which a gas is burned and the plasma generated in the flame is brought into contact with a surface to be printed of a molded article. Although plasma treatment produces a satisfactory surface-treating effect, it requires operation under reduced pressure and must be carried out in a batchwise manner, except under special circumstances. In many cases, therefore, the manufacturing process is difficult to rationalize and the processing cost is high. In corona discharge treatment, sheet materials can be continuously processed at atmospheric pressure and the processing cost is low enough. However, non-sheet materials may not be processed at all or, if possible, special processing equipment will be required. Moreover, it is known that the effect of the surface treatment will diminish with time in the case of polyolefin resins and, in particular, polyethylene resins. That is, the printability of the surface-treated articles may deteriorate after long-term storage. For molded articles unfit for the foregoing methods (e.g. relatively large-sized articles having undulating surfaces), flame treatment is often employed. However, this method has the disadvantage that the effect of the surface treatment varies considerably. Moreover, this method is often unapplicable to molded articles having certain shapes, because it is impossible to prevent them from being deformed by heat.

For epoxy resins, there has recently been proposed a method for surface-treating molded articles by use of a lamp capable of efficiently emitting ultraviolet radiation having wavelengths of 185 nm and 254 nm. In other words, this method comprises exposing surfaces of such molded articles to ultraviolet radiation from a low-pressure mercury vapor lamp. This method is advantageous in that it is applicable to molded articles having a wide range of shapes and such molded articles can be processed in a rationalized production line. For polyolefin resins, however, it is less effective to expose their surfaces to ultraviolet radiation from a conventional low-pressure mercury vapor lamp for a short period of time. Accordingly, this method cannot be employed in an actual production line without modifying the primary structure of the resin or adding a suitable additive thereto. This has led to the disadvantage that the resin most suitable for the intended purpose of the product may not be chosen because of its lack of printability.

The molded articles to which the present inventors' desire for the improvement of printability is especially directed are medical containers formed by blow molding of polyolefin resins in which the wall constituting the surface to be printed or areas around it has a thickness of 1 mm or less. The conventional methods could never been applied to such molded articles because severe restrictions are imposed on their material (owing to their medical use), shape (owing to their use as containers), manufacturing process, processing cost and the like.

Also in the case of syringe barrels having a shape which can be more easily surface-treated than the aforesaid medical containers, similar restrictions are imposed thereon, though not so severe as for the aforesaid medical containers. Consequently, it is the existing state of the art that untreated surfaces of syringe barrels formed of polypropylene resins are printed with an oil ink having an affinity for the resins. For this reason, most of the ink films on commercially available syringes formed of polypropylene resins are removed simply by rubbing them with a hand.

Moreover, syringes are used for a variety of medical fluids, some of which have the nature of an oil or oil-like substance. If such a medical fluid comes into contact with the surface of a syringe barrel, the ink film will be dissolved away and, in the worst case, the graduations cannot be read at all. That is, a solvent type ink having an affinity for polypropylene resins also has an affinity for oils, so that the ink film will be dissolved thereby.

BRIEF SUMMARY OF THE INVENTION

The main object of the present invention is to provide a surface treatment method for improving the printability of a surface of a molded article consisting of a polyolefin resin (in particular, a polyethylene resin) or a surface of a syringe barrel formed of a polypropylene resin, which method does not require the use of any special expensive modified resin, imposes few restrictions on the shape of the article to be printed, exhibits good uniformity of surface treatment, does not require expensive equipment, permits continuous operation and easy production control, involves a low processing cost, and produces a surface highly adherent to the cured films of ultraviolet radiation-curing inks.

In order to accomplish the above and other objects, the present inventors have made an intensive investigation and have found that the printability of a surface of a molded article consisting of a polyethylene or polypropylene resin can be improved simply by exposing the surface, for a short period of time, to ultraviolet radiation from a high-output low-pressure mercury vapor lamp having an envelope made of synthetic quartz glass. The present invention has been completed on the basis of this finding.

The "high-output low-pressure mercury-vapor lamp having an envelope made of synthetic quartz glass" used in the present invention is one capable of emitting an abundance of ultraviolet radiation having wavelengths of 185 nm and 254 nm, and an example thereof is being sold by Japan Storage Battery Co., Ltd. as model L250US, or by Orc Manufacturing Co., Ltd. as VUV-100A/5.3U. It has been difficult to obtain a large quantity of ultraviolet radiation of the aforesaid wavelengths by using a conventionally available ultraviolet lamp having an ordinary quartz envelope.

In the case of a conventional low-pressure mercury vapor lamp, as its output is increased (i.e., the applied voltage is raised), its temperature and hence its internal pressure become higher. Thus, the lamp ceases to be a low-pressure mercury vapor lamp. In other words, the proportion of high-energy ultraviolet radiation of shorter wavelengths, which is characteristic of a low-pressure mercury vapor lamp, becomes lower. Then, the so-called high-outout low-pressure mercury vapor lamp has been introduced. This lamp is characterized by cooling the electrodes or the whole lamp so as to prevent its temperature from rising and thereby maintain a low internal pressure. Thus, the lamp is able to give a high output and, at the same time, emit a high proportion of high-energy ultraviolet radiation of shorter wavelengths.

According to the present invention, there is provided a surface treatment method for improving the printability of a surface of a molded article consisting of a polyolefin resin, which comprises exposing the surface to ultraviolet radiation from a high-output low-pressure mercury vapor lamp having an envelope made of synthetic quartz glass.

This method can be effectively applied even to a surface to be printed of such a molded article in which at least a part of the surface to be printed or areas around it is constituted by an undulating surface or a surface liable to deform into an undulating state.

BRIEF DESCRIPTION OF THE DRAWINGS

The present invention will be better understood by reference to the following detailed description taken in connection with the accompanying drawings, in which:

FIG. 1 is a perspective view of a container being processed by the surface treatment method of the present invention;

FIG. 2 is a front view of the container for medical fluids which was taken as an example for illustrating the surface treatment method of the present invention;

FIG. 3 is a sectional view taken on line A—A' in FIG. 2;

DETAILED DESCRIPTION OF THE PREFERRED EMBODIMENTS

Figure 4:
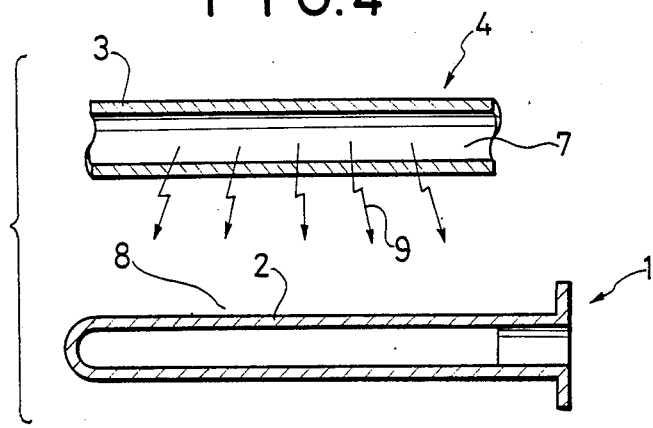
FIG. 4 is a sectional view illustrating the principle on which the printability of the surface of the container is improved in accordance with the present invention.

Referring to FIG. 1, there is shown a perspective view of a container 1 being processed by the surface treatment method of the present invention. Specifically, the printability of the surface 2 to be printed of the container 1 can be improved by exposing the surface 2 to ultraviolet radiation from a high-output low-pressure mercury vapor lamp 4 having an envelope 3 made of synthetic quartz glass.

As shown in FIGS. 2 and 3, the container 1 is a bottle which has been formed by blow molding of a polyethylene resin and whose wall 5 is thin enough to be liable to deformation. The container 1 must be surface-treated prior to printing, because a film 6 of printing ink does not adhere closely to the untreated surface of the resin constituting the container 1. However, since its surface 2 to be printed is liable to deform into an undulating state, the conventional methods of surface treatment cannot be employed owing to the above-described disadvantages thereof.

FIG. 4 is a sectional view illustrating the principle on which the printability of the surface of the container is improved in accordance with the present invention. A large quantity of high-energy ultraviolet radiation 9 (i.e., ultraviolet radiation having wavelengths of 185 nm and 254 nm) generated within the envelope 7 of the high-output low-pressure mercury vapor lamp 4 can pass through the wall 3 made of synthetic quartz glass without undergoing any significant attenuation. Then, the ultraviolet radiation converts oxygen present in the air 8 around the container 1 into ozone. Furthermore, when exposed to be the ultraviolet radiation, the ozone produces radicals, i.e., active oxygen. The active oxygen has high oxidizing power and combines with the hydrogen contributing to the hydrophobicity of the resin. Thus, the hydrogen is removed from the resin surface (i.e., the surface 2 to be printed), resulting in an increased cohesive force of the resin surface. At the same time, oxygen binds to the resin surface itself to further increase the cohesive force of the resin surface. Moreover, ultraviolet radiation having a wavelength of 185 nm directly cleaves the molecular structure of the resin surface and effects recombination or cross-linking to increase the cohesive force of the resin surface. Thus, the adhesion of the ink film 6 to the printed surface 2 is enhanced by the above-described various effects of ultraviolet radiation.

One of the reasons why the printability of surfaces of polyolefin resin moldings (in particular, polyethylene or polypropylene resin moldings) has not been improved by exposure to ultraviolet radiation from conventional low-pressure mercury vapor lamps, seems to be that the lamps fail to emit a large quantity of ultraviolet radiation having a wavelength of 185 nm. Another reason seems to be that, in the case of lamps not having an envelope made of synthetic quartz glass, ultraviolet radiation having a wavelength of 185 nm is absorbed by the wall of the envelope and its quantity emitted to the outside of the lamp is significantly decreased.

Figure 5:
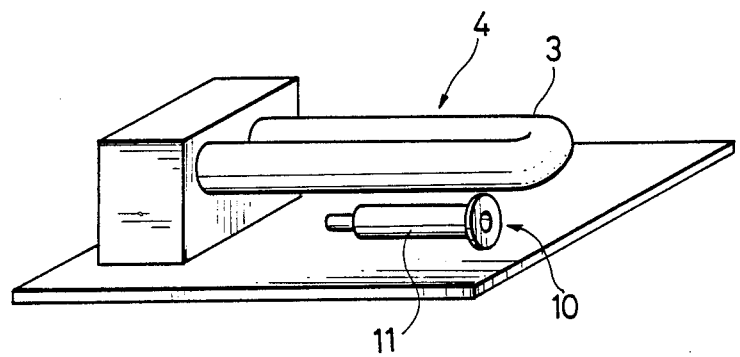
FIG. 5 is a perspective view of a syringe barrel being processed by the surface treatment method of the present invention.

FIG. 5 is a perspective view of a syringe barrel 10 being processed by the surface treatment method of the present invention. Specifically, the printability of the surface 11 to be printed of the syringe barrel 10 can be improved by exposing the surface 11 to ultraviolet radiation from a high-output low-pressure mercury vapor lamp 4 having an envelope 3 made of synthetic quartz glass.

Figure 6:
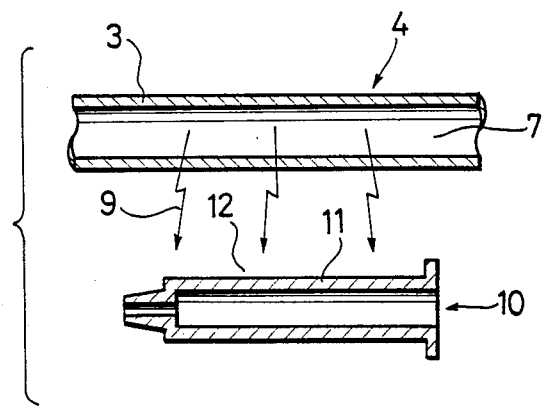
FIG. 6 is a sectional view illustrating the principle on which the printability of the surface of the syringe barrel is improved in accordance with the present invention.

FIG. 6 is a sectional view illustrating the principle on which the printability of the surface of the syringe barrel is improved in accordance with the present invention. A large quantity of high-energy ultraviolet radiation 9 (i.e., ultraviolet radiation having wavelengths of 185 nm and 254 nm) generated within the envelope 7 of the high-output low-pressure mercury vapor lamp 4 can pass through the wall 3 made of synthetic quartz glass without undergoing any significant attenuation. Then, the ultraviolet radiation converts oxygen present in the air 12 around the syringe barrel 10 into ozone. Furthermore, when exposed to be the ultraviolet radiation, the ozone produces radicals, i.e., active oxygen. The active oxygen has high oxidizing power and combines with the hydrogen contributing to the hydrophobicity of the resin. Thus, the hydrogen is removed from the resin surface (i.e., the surface 2 to be printed), resulting in an increased cohesive force of the resin surface. At the same time, oxygen binds to the resin surface itself to further increase the cohesive force of the resin surface. Moreover, ultraviolet radiation having wavelength of 185 nm directly cleaves the molecular structure of the resin surface and effects recombination or cross-linking to increase the cohesive force of the resin surface. Thus, the adhesion of the ink film to the printed surface 11 is enhanced by the above-described various effects of ultraviolet radiation.

The present invention will be more specifically explained with reference to the following examples.

EXAMPLE 1

A container in the shape of a flattened bottle having an average wall thickness of 0.2 mm was formed by blow molding of a polyethylene resin (LLDPE) having a density of 0.92 and a melt index of 2. Although the surface to be printed of the container was flat at the time of its molding, the surface was so liable to deformation that, on standing, it undulated under the influence of gravity. After air was introduced into the container until its as-molded shape was restored, the container was placed with its surface to be printed facing upward. Then, the surface was exposed to ultraviolet radiation from a high-output low-pressure mercury vapor lamp having an envelope made of synthetic quartz glass. This lamp had an output of 250 W and a wattage per unit lamp length of 0.5 W/mm. The conditions of exposure to ultraviolet radiation were such that the distance between the exposed surface and the lamp was 20 mm and the exposure time was 10 seconds.

Subsequently, using a printer of the direct letterpress printing type, the exposed surface of the container was printed with an ultraviolet radiation-curing ink. Then, the ink was cured by placing the container with the printed surface facing upward and exposing it to ultraviolet radiation from a high-pressure mercury vapor lamp having an output of 2 kW and a wattage per unit lamp length of 0.1 kW/cm. The conditions of exposure to ultraviolet radiation were such that the distance between the printed surface and the lamp was 80 mm and the exposure time was 4 seconds.

The printed container was cooled to room temperature and then subjected to an adhesive tape peeling test. The ink film did not stick to the adhesive tape at all.

COMPARATIVE EXAMPLE 1

A container similar to that used in Example 1 was printed under the same conditions as described in Example 1, except that the exposure to ultraviolet radiation from the high-output low-pressure mercury vapor lamp was omitted. When the printed container was subjected to an adhesive tape peeling test, almost all of the ink film stuck to the adhesive tape.

COMPARATIVE EXAMPLE 2

A container similar to that used in Example 1 was printed under the same conditions as described in Example 1, except that the high output low-pressure mercury vapor lamp was replaced by a low-pressure mercury vapor lamp having an envelope made of synthetic quartz glass but having an output of 25 W and a wattage per unit lamp length of 0.05 W/mm, and that the distance between the printed surface and the lamp was 7 mm and the exposure time was 3 minutes. When the printed container was subjected to an adhesive tape peeling test, the result was substantially the same as obtained in Comparative Example 2.

EXAMPLE 2

A syringe barrel was formed by injection molding of a polypropylene resin having a density of 0.90 and a melt flow rate of 25. This syringe barrel was placed with its surface to be printed facing upward, and then exposed to ultraviolet radiation from a high-output low-pressure mercury vapor lamp having an envelope made of synthetic quartz glass. This lamp had an output of 250 W and a wattage per unit lamp length of 0.5 W/mm. The conditions of exposure to ultraviolet radiation were such that the distance between the exposed surface and the lamp was 40 mm and the exposure time was 10 seconds.

Subsequently, using a printer of the direct letterpress printing type, the exposed surface of the syringe barrel was printed with an ultraviolet radiation-curing ink. Then, the ink was cured by placing the container with the printed surface facing upward and exposing it to ultraviolet radiation from a high-pressure mercury vapor lamp having an output of 2 kW and a wattage per unit lamp length of 0.1 kW/cm. The conditions of exposure to ultraviolet radiation were such that the distance between the printed surface and the lamp was 100 mm and the exposure time was 4 seconds.

The printed syringe barrel was cooled to room temperature and then subjected to an adhesive tape peeling test. The ink film did not stick to the adhesive tape at all.

COMPARATIVE EXAMPLE 3

A syringe barrel similar to that used in Example 2 was printed under the same conditions as described in Example 2, except that the exposure to ultraviolet radiation from the high-output low-pressure mercury vapor lamp was omitted. When the printed syringe barrel was subjected to an adhesive tape peeling test, almost all of the ink film stuck to the adhesive tape.

COMPARATIVE EXAMPLE 4

A syringe barrel similar to that used in Example 2 was printed under the same conditions as described in Example 2, except that the high-output low-pressure mercury vapor lamp was replaced by a low-pressure mercury vapor lamp having an envelope made of synthetic quartz glass but having an output of 25W and a wattage per unit lamp length of 0.05 W/mm, and that the distance between the printed surface and the lamp was 7 mm and the exposure time was 1 minute. When the printed syringe barrel was subjected to an adhesive tape peeling test, the result was substantially the same as obtained in Comparative Example 3.

As described above, the surface treatment method of the present invention can be applied to a surface to be printed of a molded article consisting of a polyolefin resins in which at least a part of the surface to be printed or areas around it is constituted by an undulating surface or a surface liable to deform into an undulating state, thereby permitting the surface to be easily printed without any significant restrictions on the material, shape, manufacturing process, processing cost and the like.

In particular, the present invention is markedly effective where the molded article is a container formed by blow molding in which the wall constituting the surface to be printed or areas around it has a thickness of 1 mm or less and where the printing ink is of the ultraviolet radiation-curing type.

Moreover, the surface treatment method of the present invention can also be applied to a surface to be printed of a syringe barrel formed of a polypropylene resin, thereby permiting the surface to be easily printed without any significant restrictions on the material, shape, manufacturing process, processing cost and the like. Especially where the printing ink is of the ultraviolet radiation-curing type, the present invention is markedly effective.

We claim:

1. A surface treatment method for improving the adhesiveness of a surface of a molded article, consisting essentially of a polyolefin resin with a printing ink, which comprises irradiating the surface with an abundance of high-energy ultraviolet radiation from a high-output low-pressure mercury vapor lamp having an envelope made of synthetic quartz glass, and wherein said mercury vapor lamp has a wattage per unit lamp length of about 0.1–0.5 W/mm.

2. The surface treatment method as claimed in claim 1, wherein the polyolefin resin is a polyethylene resin.

3. The surface treatment method as claimed in claim 1, wherein the molded article is a container formed by blow molding, the container having a wall constituting the surface to be printed or areas adjacent thereto having a thickness of 1 mm or less, and wherein the container is rendered printable with an ultraviolet radiation-curable printing ink.

4. The surface treatment method as claimed in claim 3, wherein the container is a container for medical fluids.

5. The surface treatment method as claimed in claim 1, wherein the molded article is a syringe barrel formed of a polypropylene resin.

6. The surface treatment method as claimed in claim 5, wherein the syringe barrel is rendered printable with an ultraviolet radiation-curable printing ink.

7. The surface treatment method as claimed in claim 5, wherein the syringe barrel is for medical use.

8. The surface treatment method as claimed in claim 1, wherein said high-energy ultraviolet radiation comprises wavelengths of about 185 nm and 254 nm.

9. The surface treatment method as claimed in claim 1, wherein said polyethylene resin has a density of 0.92 and a melt index of 2.

10. The surface treatment method as claimed in claim 5, wherein said polypropylene resin has a density of 0.90 and a melt flow rate of 25.

* * * * *